United States Patent [19]
Jacob et al.

[11] Patent Number: 5,165,329
[45] Date of Patent: Nov. 24, 1992

[54] ELECTRIC DEEP FAT FRYER

[75] Inventors: Robert C. J. Jacob; Francois J. Lucas, both of Caen; Jean V. Miriel, Cormelles-Le-Royal, all of France

[73] Assignee: Moulinex (Societe Anonyme), Bagnolet, France

[21] Appl. No.: 709,018

[22] Filed: May 31, 1991

[30] Foreign Application Priority Data

Jun. 12, 1990 [FR] France .................. 90 07263

[51] Int. Cl.$^5$ .......................................... A47J 37/12
[52] U.S. Cl. .......................................... 99/336; 99/407; 99/410
[58] Field of Search ............... 99/407, 410, 336, 404, 99/411, 325, 334, 335, 352, 355, 403, 412, 413, 444, 328, 327, 337; 74/3.54; 475/149, 254, 331, 158, 151, 223, 224, 332; 134/135

[56] References Cited

U.S. PATENT DOCUMENTS

| | | | |
|---|---|---|---|
| 2,253,752 | 8/1941 | Bemis | 74/3.54 |
| 2,430,444 | 11/1947 | Bemis | 99/335 |
| 2,546,464 | 3/1951 | Martin | 99/336 |
| 2,735,355 | 2/1956 | Brenner | 99/410 |
| 2,762,291 | 9/1956 | Haley | 99/336 |
| 2,766,680 | 10/1956 | Tagliaferri | 99/404 |
| 2,958,510 | 11/1960 | Finch | 99/336 |
| 3,026,790 | 3/1962 | Aruan | 99/336 |
| 3,071,064 | 1/1963 | Horvath | 99/336 |

FOREIGN PATENT DOCUMENTS

| | | | |
|---|---|---|---|
| 0309435 | 3/1989 | European Pat. Off. | 99/410 |
| 0330478 | 12/1920 | Fed. Rep. of Germany | 99/336 |
| 1513132 | 2/1968 | France . | |

Primary Examiner—Philip R. Coe
Assistant Examiner—Tony Soohoo
Attorney, Agent, or Firm—Young & Thompson

[57] ABSTRACT

An electric deep fat fryer comprising a pan (1) for containing a cooking bath (2), an electric heating resistance, and a basket (3) for foodstuff to be fried, the basket being adapted to occupy either a lowered position in which the pan is immersed in the bath or an elevated position in which the basket is maintained above the bath. Mechanism (4) is provided for lowering and raising the basket, controlled by a control device comprising a timer (5). The mechanism for lowering and raising the basket and the timer are driven by a single motor (6). The control device comprises an automatic selector (25) controlled by a control member (26) of the timer and by the position of the basket, so as to drive either the timer when the basket occupies its lowered position, or the mechanism for lowering and raising the basket. Particular utility in household deep fat fryers.

6 Claims, 4 Drawing Sheets

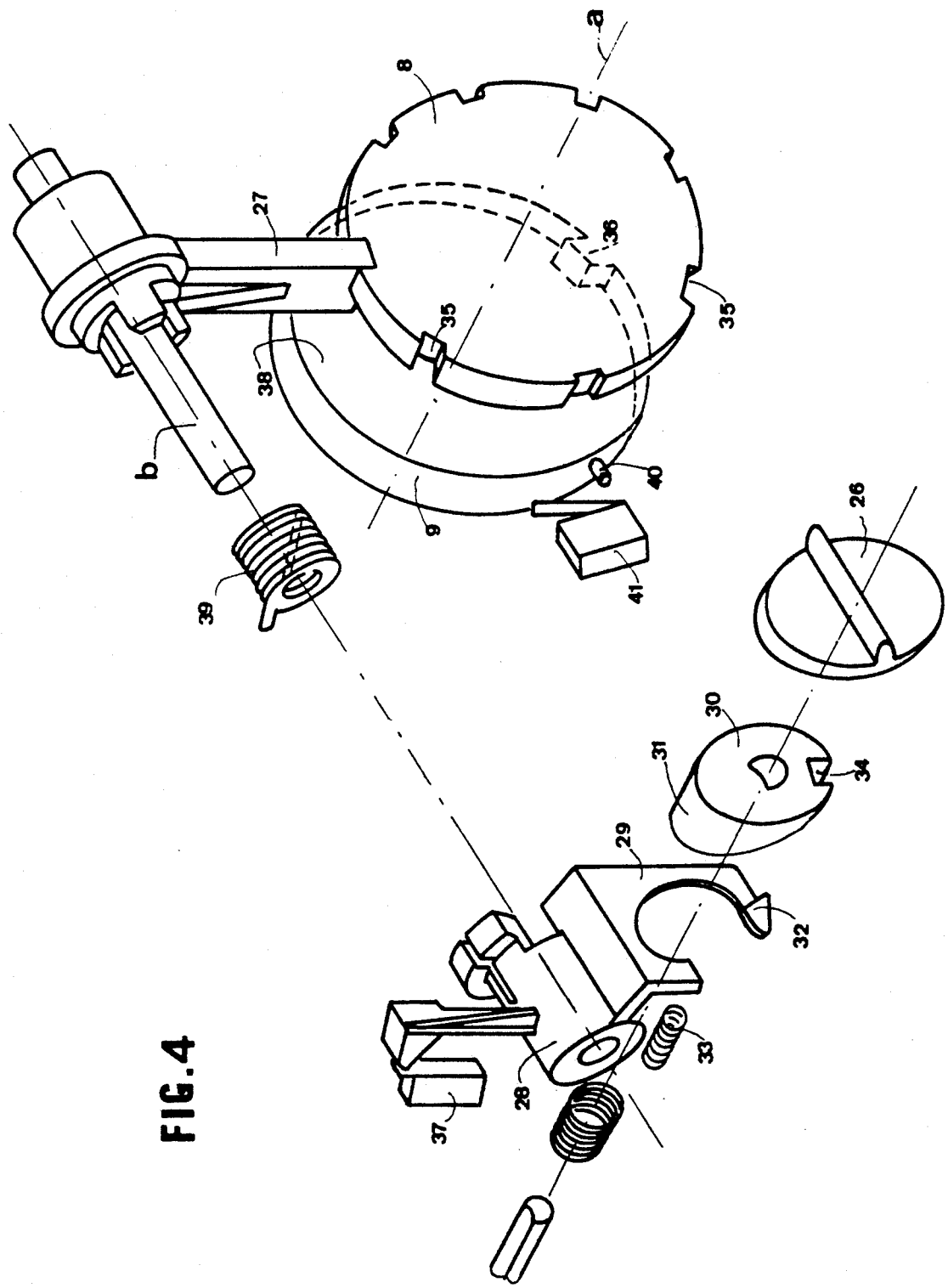

ELECTRIC DEEP FAT FRYER

The invention relates to an electric deep fat fryer comprising, in a housing, a pan containing a cooking bath, an electric heating resistance adapted to heat said pan, as well as a basket adapted to receive foodstuff to be fried.

The invention relates more particularly to a deep fat fryer of this type in which the basket is adapted to occupy either a lowered position in which the basket is immersed in the bath, or an elevated position in which the basket is maintained above the bath, thanks to motorized means for lowering and raising the basket controlled by a control device comprising an adjustable motorized mechanical timer.

In known deep fat fryers of this type, the basket in raised position is lowered to its lowered position when the temperature of the cooking bath attains a suitable temperature, the timer then counting down to the end of cooking, whereupon the basket rises to its elevated position. To carry out this cycle, these deep fat fryers are provided with a more or less complex control device adapted to control selectively two independent motors, a motor for the timer and a motor for the motorized means for lowering and raising the basket, which has the drawback of being cumbersome and bulky.

The invention has for its object to overcome these drawbacks and particularly to provide a reliable automatic deep fat fryer which will be inexpensive, compact and adapted to be mass produced.

According to the invention, the means for lowering and raising the basket and the timer are driven by a single motor, and the control device comprises moreover automatic selection means controlled by an adjustment member of the timer and by the position of the basket, so as selectively to drive either the timer when the basket occupies its lowered position or the means for lowering and raising the basket.

Thus, thanks to said selection means, the motor fulfills successively two functions, the driving of the timer and the driving of the lowering and raising means of the basket. Moreover, there is obtained a cooking cycle which is entirely automatic with a minimum of constituent elements. The mechanism being moreover entirely electromechanical, it is reliable, economical and compact.

The characteristics and advantages of the invention will become further apparent from the description which follows, by way of example, with reference to the accompanying drawings, in which:

FIG. 3 is a vertical cross section on the line III—III of FIG. 2 on an enlarged scale; and FIG. 4 is an exploded perspective view in the direction of the arrow F of FIG. 3, showing the selection means and the adjustment member of the timer.

Figure 1:
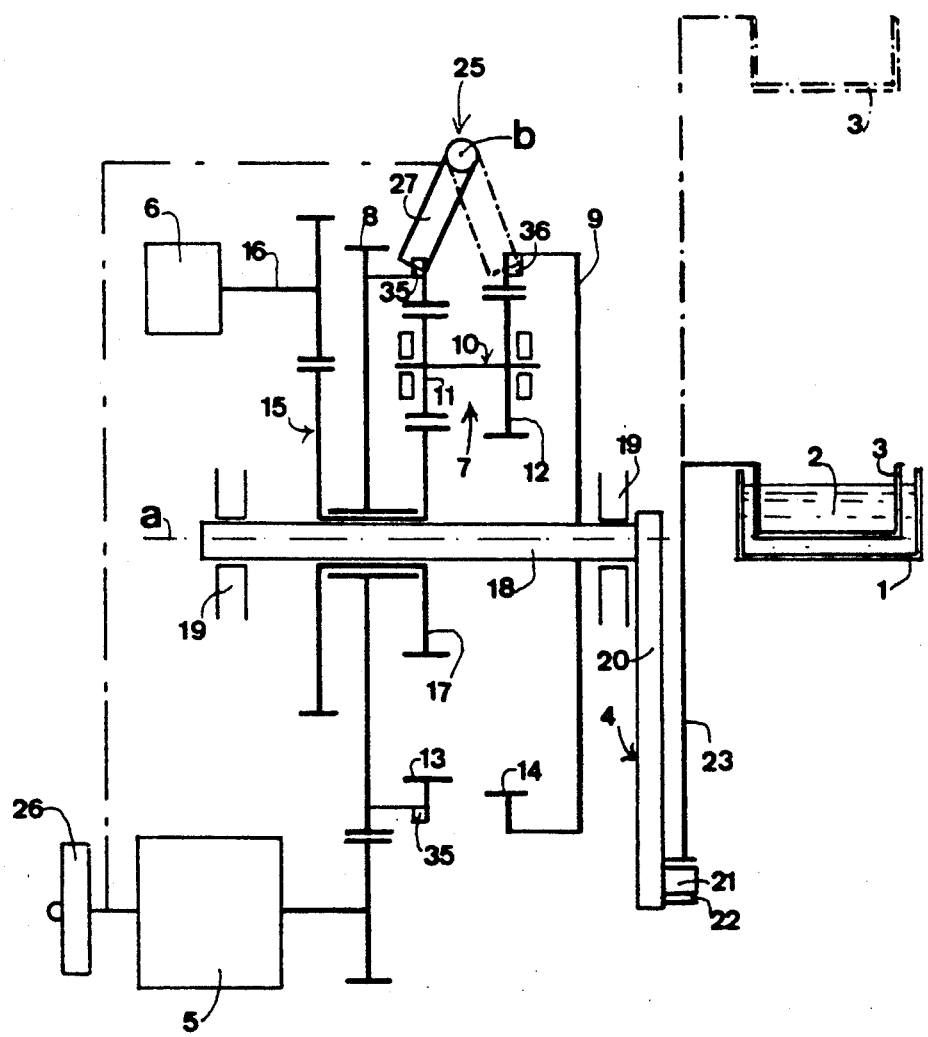
FIG. 1 is a schematic view of a deep fat fryer according to the invention showing the movement of the control device of the motorized means for lowering and raising the basket.

The electric deep fat fryer schematically shown in FIG. 1 comprises, in a housing (not shown), a pan 1 containing a cooking bath 2, an electric heating resistance (not shown) adapted to heat said bath 2, as well as a basket 3 adapted to receive the foods to be fried. The basket 3 is adapted to occupy either a lowered position (shown in full line in FIG. 1) in which the basket 3 is immersed in the bath 2, or an elevated position (shown in broken line in FIG. 1) in which the basket 3 is maintained above bath 2, thanks to motorized means 4 for lowering and raising the basket 3 controlled by a control device comprising a motorized adjustable mechanical timer 5.

Figure 2:
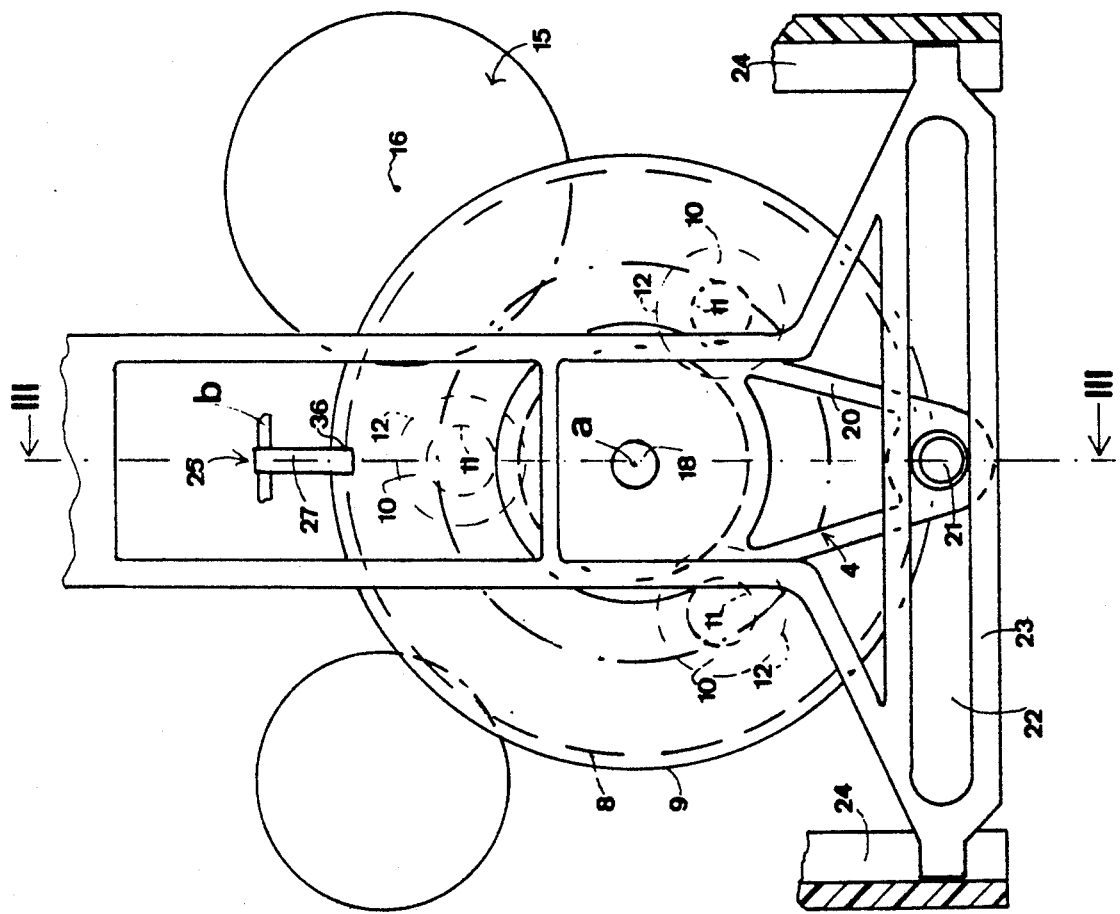
Figure 3:
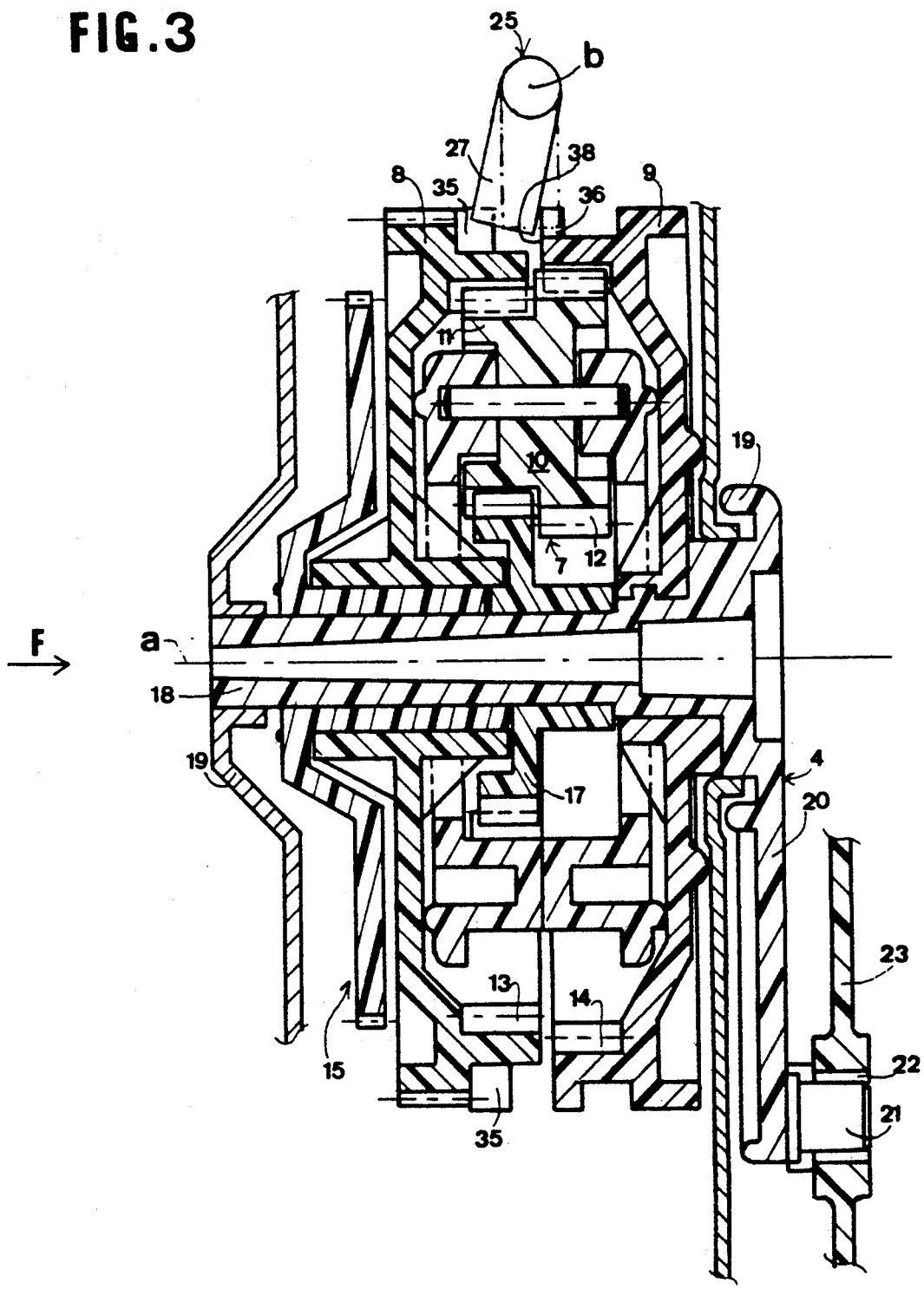
FIG. 3 is an elevational view particularly showing the motorized means for lowering and raising the basket.

According to the invention and as shown in FIGS. 1, 2 and 3, the means 4 for lowering and raising the basket and the timer 5 are driven by a single motor 6. A synchronous motor of the type commonly used in timers is preferably used. Motor 6 drives in rotation about an axis a, by means of a movement transmission 7, a drive crown gear 8 of the timer and a drive crown gear 9 of the means for lowering and raising the basket, the so-called drive gear of the basket.

The movement transmission 7 is constituted by an epicycloidal gear train disposed between the two crown gears 8, 9 which are for this purpose internally toothed, and comprise at least one planet, but preferably three planets 10 (FIG. 2) each having two toothed wheels 11, 12 fixed to each other for rotation and engaging respectively with the internal teeth 13, 14 of the two crown gears 8, 9.

The planets 10 of transmission 7 are driven in rotation by a series of gears 15 which are themselves driven in rotation by shaft 16 of motor 6. The output wheel 17 of said gear train engages with a wheel 11 of the two wheels of each planet 10.

The drive crown gear 8 of the timer and the output wheel 17 of the gear train 15 are mounted idly on a shaft 18 coaxial with axis a of the crown gears 8, 9 and secured to the drive crown gear 9 of the basket. This shaft 18 is mounted in two bearings 19 secured to the housing.

The means 4 for lowering and raising the basket comprise a crank arm 20 driven in rotation by the drive crown gear 9 of the basket and whose free end 21 extends into an opening 22 provided in a slide 23 secured to basket 3 and mounted linearly displaceably in at least one slideway, but preferably two slideways 24, such that the rotation of crank arm 20 will be translated into vertical rectilinear movement of the basket 3.

The invention also provides that the control device comprises moreover automatic selection means 25 controlled by an adjustment member 26 of the timer 5 and by the position of basket 3, so as to drive selectively either the timer 5 when the basket 3 occupies is lowered position, or the means 4 for lowering and raising the basket. To this end, the selection means 25 comprises a movable blocking finger 27 which can occupy two positions, either a blocking position of the timer (shown in full lines in FIGS. 1, 3 and 4) in which said finger 27 blocks the rotation of the drive crown gear 8 of the timer and permits rotation of the drive crown gear 9 of the basket, or a position for blocking the basket (shown in broken lines in FIGS. 1 and 3) in which said finger 27 blocks the rotation of the drive crown gear 9 of the basket and permits rotation of the drive crown gear 8 of the timer.

Thus, thanks to selection means 25, the motor 6 performs successively two functions, the drive of the raising and lowering of basket 3 and the drive of the timer 5.

As is seen in FIG. 4, the blocking finger 27 being mounted pivotally about an axis b transverse to the axis a of crown gears 8, 9, the selection means 25 comprises also two elements, namely a first element 28 fixed for rotation with finger 27 and comprising a lever 29 pivoting about axis b of the finger, and a second element 30 fixed for rotation with adjustment member 26 of the timer and comprising a cam 31 which comes to bear against the free end 32 of lever 29 under the action of resilient means 33, for example a coil spring, such that the position of finger 27 is a function of the position of the free end 32 on cam 31. Thus, the selection means 25 is subject to the adjustment member 26 of the timer 5.

To improve the performance of cam 31, the second element 30 has an opening 34 in which will be disposed the free end 32 of lever 29 when it causes the finger to pivot in the direction of the drive crown gear 8 of the timer.

The drive crown gear 8 of the timer comprises a plurality of peripheral recesses 35 adapted to receive the blocking finger 27 in position for blocking the timer, while the drive crown gear 9 of the basket comprises a single notch 36 on the periphery of said crown gear 9 and adapted to receive the blocking finger 27 in the position of blocking the basket 3 only when the basket occupies its lowered position. Thus, the selection means 25 is also subject to the position of basket 3.

The operation of the deep fat fryer according to the invention is thus entirely automatic.

Let is be supposed that at the outset basket 3 occupies its raised position (shown in broken lines in FIG. 1) and that the finger 27 is engaged in a recess 35 of the drive crown gear 8 of the timer (finger shown in full line in FIGS. 1, 3 and 4).

The user sets a cooking time by turning the adjustment member 26 of the timer 5 from its "zero" position to a selected position. The rotation of said member 26 which cannot exceed one complete turn, drives the cam 31, which bears progressively under the influence of spring 33 against the free end 32 of lever 29, which rises on said cam and effects rotation of the first member 28. This movement actuates various switches, in particular switch 37 to initiate heating of the cooking bath. These switches are integrated in the electric circuit (not shown) of the control device. This movement of rotation of the first element 28 is transmitted to the blocking finger 27 which pivots toward the drive crown gear 9 of the basket. Because the notch 36 does not coincide with finger 27, finger 27 bears against the side peripheral surface 38 of said crown gear 9, while continuing to block the drive crown gear 8 of the timer 5.

When the cooking bath 2 reaches the cooking temperature, the control device starts the operation of motor 6. Motor 6 drives in rotation by means of gear train 15 three planets 10. Indeed, output wheel 17 of gear train 15 engages with a wheel 11 of the two wheels of each planet 10. The drive crown gear 8 of the timer being blocked, a toothed wheel 11 of each planet 10 rolls on the internal teeth of the drive crown gear 8 of the timer while the other toothed wheel 12 drives in rotation the drive crown gear 9 of the basket by its internal teeth 14.

The basket 3 descends to its lowered position (shown in full lines in FIGS. 1 and 2) in which position the notch 36 registers with finger 27, whereupon the finger 27 is then moved abruptly into notch 36 by a trigger spring 39, thereby blocking the drive crown gear 9 of the basket and freeing the drive crown gear of the timer (see the broken lines in FIGS. 1 and 3). The motor 6 thus drives, via gear train 15 and epicycloidal train 7, the drive crown gear 8 of the timer, which begins counting down the time.

The rotation of the timer 5 effects a rotation of the adjusting member 26 toward its "zero" position, as well as the drive of the cam 31, at the same time that the lever 29 being urged by spring 33, its free end 32 descends progressively along the cam and the finger 27 is brought progressively by pivoting toward the drive crown gear 8 of the timer.

At the end of cooking, when the time has elapsed, the free end 32 of lever 39 engages in opening 34 of second element 30, and as soon as a recess 35 comes into registry with finger 27, finger 27 engages abruptly in said recess 35 thanks to trigger spring 39, and blocks the rotation of the drive crown gear 8 of the timer while freeing the drive crown gear 9 of the basket. Thanks to the epicycloidal train 7, the motor 6 thus drives the drive crown gear 9 of the basket, and the basket 3 rises to its elevated position. Upon arriving at this position, the drive crown gear 9 of the basket acts by a lug 40 disposed on its periphery on a switch 41 to interrupt the current supply of the motor 6. The deep fat fryer is then ready for a new cycle of automatic cooking.

It will be understood that the user may at any moment interrupt the cooking by turning the adjustment member 26 of the timer toward its "zero" position such that the finger 27 will block the drive crown gear 8 of the timer to cause the basket 3 to rise. The user can thus achieve a manual cooking cycle for cooking "by eye".

What is claimed is:

1. In an electric deep fat fryer comprising, in a housing, a pan (1) adapted to contain a cooking bath (2), an electric heating resistance adapted to heat said bath (2), a basket (3) adapted to receive food to be fried and adapted to occupy alternately a lowered position in which the basket (3) is immersed in the bath (2) and a raised position in which the basket (3) is maintained above the bath (2), motorized means (4) for lowering and raising the basket (3), control means comprising a motorized adjustable mechanical timer (5) and controlling said motorized means (4), and a single motor (6) driving both the motorized means (4) for lowering and raising the basket and the timer (5); said control means comprising also automatic selection means (25) responsive to a selectively settable control member (26) of the timer (5) and responsive to the position of the basket (3), so that the motor (6) drives either the timer (5) when the basket (3) occupies its lowered position, or the motorized means (4) for lowering and raising the basket.

2. Electric deep fat fryer according to claim 1, wherein the motor (6) drives in rotation about an axis (a), via a movement transmission (7), a drive crown gear (8) of the timer and a drive crown gear (9) of the means for lowering and raising the basket, said automatic selection means comprising a movable blocking finger (27) which can occupy either a position for blocking the timer in which said finger (27) is engaged with the drive crown gear (8) of the timer so as to block the rotation of said gear (8) and is disengaged from the drive crown gear (9) of the basket so as to permit rotation of said gear (9), or a position for blocking the basket in which said finger (27) is engaged with the drive crown gear (9) of the basket so as to block rotation of said gear (9) and is disengaged from the drive crown gear (8) of the timer so as to permit rotation of said gear (8).

3. Electric deep fat fryer according to claim 2, wherein the movement transmission (7) is constituted by an epicycloidal gear train disposed between the two said crown gears (8, 9), said two crown gears having internal teeth, the epicycloidal gear train comprising at least one planet (10) having two toothed wheels (11, 12) fixed together for rotation and engaging respectively with the internal teeth (13, 14) of the two crown gears (8, 9).

4. Electric deep fat fryer according to claim 2 wherein the blocking finger (27) is pivotally mounted on the housing for swinging movement about an axis (b) transverse to the axis (a) of the crown gears (8, 9), said automatic selection means (25) further comprising two pieces of which a first piece (28) is fixed for rotation with the finger (27) and comprises a lever (29) pivoting about said axis (b) of the finger, and of which a second piece (30) fixed for rotation with the control member (26) of the timer and comprises a cam (31) which bears on a free end (32) of the lever (29) under the influence of elastic means (33), such that the position of the finger (27) is a function of the position of said free end (32) on said cam (31).

5. Electric deep fat fryer according to claim 2, wherein said drive crown gear (8) of the timer comprises a plurality of peripheral recesses (35) adapted to receive said blocking finger (27) in a position for blocking the timer, while said drive crown gear (9) of the basket comprises a single notch (26) disposed on a periphery of the said drive crown gear (9) and adapted to receive said blocking finger (27) in a position for blocking the basket (3) only when the basket occupies said lowered position.

6. Electric deep fat fryer according to claim 2, wherein said means (4) for lowering and raising the basket comprise said drive crown gear (9) of the basket which drives in rotation a crank arm (20) having a free end (21), a slide (23) secured to said basket (3) and having an opening (22) in which passes said free end (21), and a slideway (24) mounted in the housing and in which said slide (23) is mounted for linear sliding movement such that rotation of said crank arm (20) is transformed into linear movement of said basket (3).

* * * * *